J. E. BECKER 3,045,429

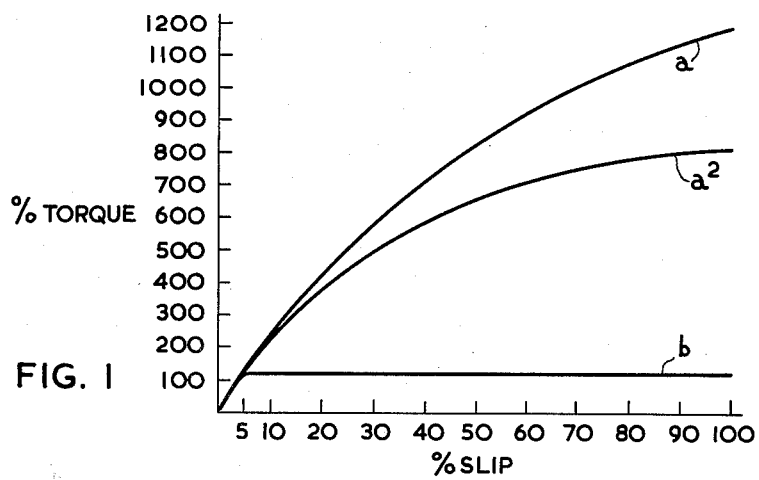
FIG. I
TORQUE CAPACITY CURVES OF;
a AND a² – ORDINARY COUPLINGS.
b – TORQUE CONTROLLED COUPLING ACCORDING TO THE INVENTION.
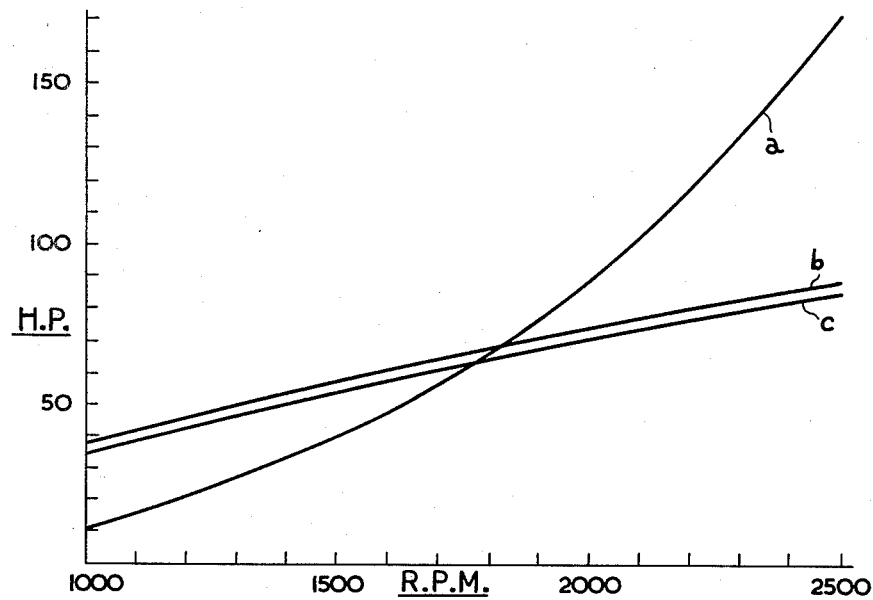
FIG. 2
POWER CURVES OF;
a – ORDINARY COUPLING.
b – COUPLING ACCORDING TO THE INVENTION.
c – ENGINE.
INVENTOR
JOHN E. BECKER
BY:
ATTORNEY July 24, 1962

FLUID COUPLINGS

Filed March 1, 1960

INVENTOR
JOHN E. BECKER

BY: *[signature]*

ATTORNEY

July 24, 1962    J. E. BECKER    3,045,429
FLUID COUPLINGS
Filed March 1, 1960    3 Sheets-Sheet 3
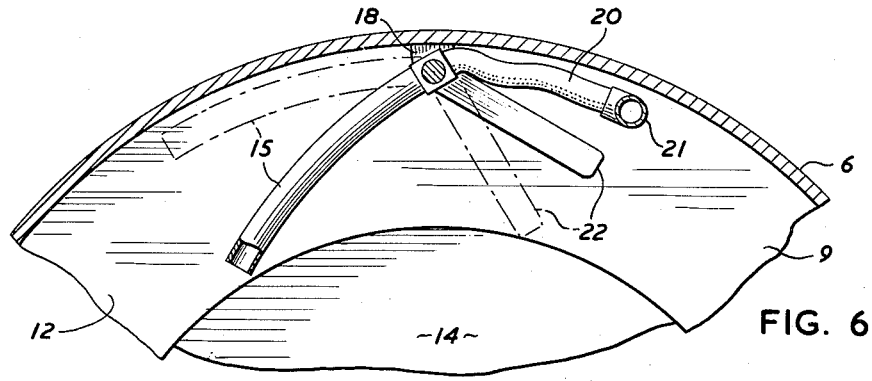
FIG. 6
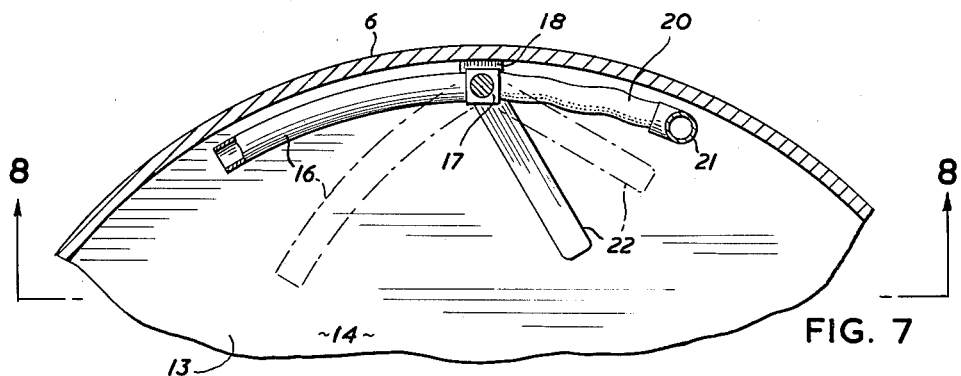
FIG. 7
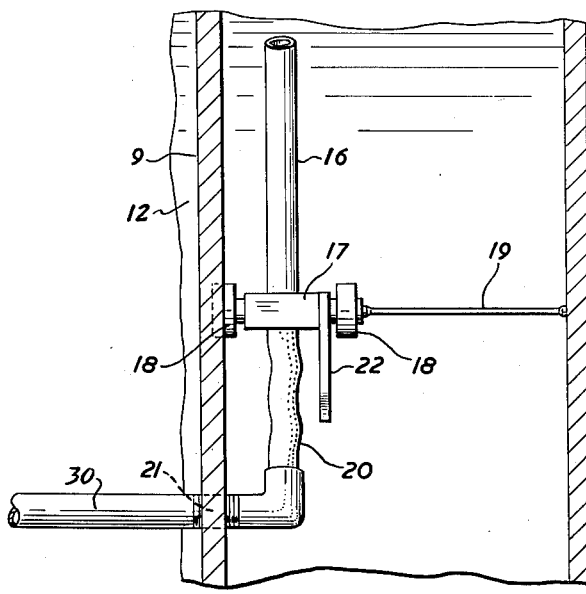
FIG. 8
FIG. 9
INVENTOR
JOHN E. BECKER
BY:
ATTORNEY 3,045,429
FLUID COUPLINGS
John E. Becker, Darlington Township, Durham County, Ontario, Canada (R.R. 3, Bowmanville, Ontario, Canada)
Filed Mar. 1, 1960, Ser. No. 12,042
3 Claims. (Cl. 60—54)

My invention relates to fluid couplings having impellers and runners formed with radial blades and the object of the invention is to provide a coupling wherein its torque capacity at stall can be controlled to be essentially only as great as the maximum torque of the coupling driving engine with fully opened throttle, so that under stalling conditions the engine speed is never reduced below the speed at which the engine produces maximum torque when the load is stalling, and whereby maximum torque is always applied to the stalling load, the coupling also being capable of transmitting full torque when operating normally at low slip.

A further object of this invention is to provide a coupling wherein its power transmitting capacity is analogous to the power producing capacity of the engine or other source of power to which the coupling is matched.

Heretofore, the inherent disadvantage in fluid couplings has been that their torque capacity increases with increasing slip and at 100% slip (stall) can amount to ten, fifteen and more times their torque capacity under normal operating conditions. As a result, when an overload slows down the runner of a fluid coupling and causes it to stall, the coupling imposes a greater torque load on the engine, causing it to slow down, under full throttle, to a speed much below half its maximum speed. It is highly unsatisfactory to operate an engine at full throttle at such low speeds, in fact most engines will stall under such conditions. Some improvement can be achieved by designing the coupling with a slip of 5 or 6% under normal operating conditions. This slip, however, causes a corresponding loss of power and creates a heat condition, and the torque capacity of the coupling under stall is still too great for satisfactory full throttle.

A further inherent disadvantage of the type of coupling under discussion is that with increasing speed its horsepower transmitting capacity increases far more rapidly than the power output of its driving internal combustion engine.

Therefore, an important object of this invention is to devise a method for analogizing the power transmitting capacity of a coupling to the power output capacity of its driving engine and which consists in designing the coupling to operate approximately at 2 or 3% slip at the lower speed-and-output-range of the engine and automatically to remove fluid from the working circuit of the coupling with increasing engine speeds in such amounts that the capacity of the coupling is substantially equal to the power produced by the engine at increased speeds, maintaining the desired percentage of slip and the resultant flexibility over the entire operating range of the engine.

My invention will be more fully understood from the following description and claims, together with the drawings, in which:

FIG. 1 is a graph illustrating the torque capacity of my coupling in comparison with that of the other couplings.

FIG. 2 is a graph illustrating the power transmitting capacity of my coupling which is arranged to be analogous to the power producing capacity of the engine to which it has been matched.

FIG. 6 is an enlarged fragmentary cross-sectional view taken through the line 6—6, FIG. 3.

FIG. 7 is a similar view to FIG. 6 and taken through the line 7—7, FIG. 3.

FIG. 8 is a further enlarged fragmentary cross-sectional view taken through the line 8—8, FIG. 7, and FIG. 9 is a fragmentary cross-sectional view taken through the line 9—9, FIG. 4.

Figure 3:
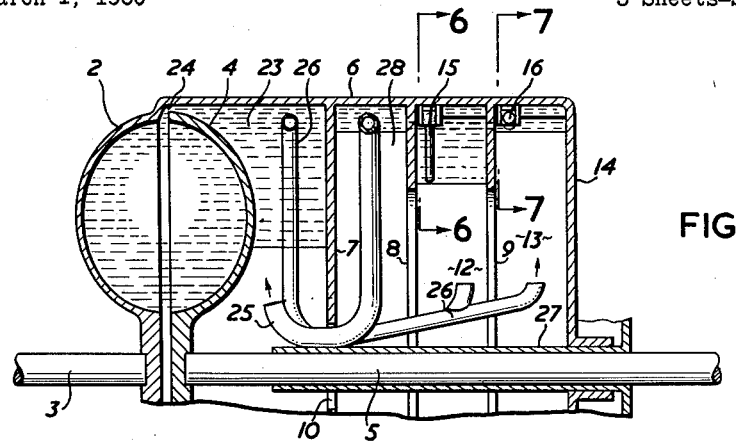
FIGS. 3, 4 and 5 are similar sectional side elevations of the upper portion of a fluid coupling embodying the fluid transfer and flow control means according to this invention, the several figures showing the operation of said means under various load and speed conditions.

As before stated, the disadvantage of couplings in use heretofore has been that their torque capacity increases with increasing slip and when completely stalled can amount to very many times more than their torque capacity under normal operating conditions as shown by the torque capacity curves in FIG. 1, it being obvious that when an overload slows the runner speed of a coupling to the point of stalling that the coupling imposes a corresponding increasing torque load upon the engine which can slow it down to stalling under full throttle.

As also before stated another disadvantage of couplings in use heretofore is that under increasing speed their horsepower transmitting capacity increases much more rapidly than the power output of their driving means and as illustrated in FIG. 2 wherein the capacity curve of a coupling is shown, which at 2% slip, will transmit the power delivered by the engine when operating at 1800 n. Thus, if a coupling operates at 2% slip at a certain engine speed, then at increased speed, this same coupling would be capable of transmitting a much greater amount of power than the engine will be able to develop; 170 N at 2500 n for the coupling as against 85 N for the engine. Under this condition the coupling will operate with so little slip that it fails to provide proper flexibility and therefore does not fulfill the reason for its installation. On the other hand, if the engine is operated at a speed which is lower than that at which the coupling was matched to the engine to operate at 2% slip, the coupling will be only capable of transmitting very substantially less power than the engine produces at this reduced speed, and will therefore increase its slip. For instance at 1400 n, 33 N for the coupling as against 50 N for the engine. This condition not only results in uneconomical operation and causes heating, but also imposes a greater torque load on the engine and causes it to slow down. Therefore, in order to supply the required amount of power to the load, the engine throttle has to be set to a greater operating speed which consequently produces still more slip and loss of power with corresponding heating. The result is an entirely unsatisfactory operation.

To overcome the foregoing set out fluid coupling deficiencies this invention is, in general, constructed and arranged as follows:

The type of fluid coupling to which this invention is applied consists, as usual, of an impeller 2 rotated by a drive shaft 3, a runner 4 rotating a driven shaft 5, and a cylindrical fluid reservoir 6 connected to the impeller to rotate therewith and in fluid communication with the impeller and runner.

In the arrangement of the invention the reservoir contains a partition 7 and a pair of spaced apart baffle rings 8 and 9 mounted upon the inner face of the peripheral wall of the reservoir. The partition is formed with a bore 10 of substantially the same diameter as the I.D. of the fluid circuit in the coupling, and the baffle rings 8 and 9 so dimensioned that the compartments 12 and 13 formed by the space between the baffle rings and the space between the baffle ring 9 and the end wall 14 of the reservoir will contain the maximum volumes of fluid which may be necessary to withdraw from the circuit in the operation of the invention. For control of the quantities of fluid centrifugally retained within the compartments 12 and 13, the compartments contain centrifugally swingable open ended fluid drain pipes 15 and 16, which dependent upon the rotative speed of the engine or other source of power (not shown) and the resulting rotative speed of the impeller and reservoir govern the depths and consequent volumes of fluid within the compartments.

Preferred forms of the two drain pipe arrangements are shown in FIGS. 6–8. Each arrangement comprises a tubular yoke 17 pivotally mounted between a pair of brackets 18 carried upon the inner face of the reservoir. The yoke at its pivotal axis is attached to one end of a torsion bar 19, the other end of the torsion bar being attached in the case of the drain pipe in the compartment 12 to the wall of the baffle ring 9 and in the case of the drain pipe in the compartment 13 to the end wall 14 of the reservoir. The yoke in the compartment 12 carries the fluid drain pipe 15 and the yoke in the compartment 13 carries the fluid drain pipe 16. In each yoke arrangement the drain pipe communicates through its yoke with a length of very flexible tubing 20 which in the compartment 13 opens into a port 21 in the ring 9 to communicate with a pipe 30 extending across the compartment 12 to empty fluid into the chamber 28. The tube 20 in the compartment 12 opens into a similar port in the ring 8 also emptying fluid into the chamber 28. An arm 22 is secured to each swingable yoke to constitute a slightly out of balance counter weight to the drain pipe extending from the yoke.

In the drain pipe arrangement in compartment 13, FIG. 7, the drain pipe 16 is somewhat heavier than its counter weight whereby under centrifugal force the drain pipe swings towards and into the vicinity of the peripheral wall of the reservoir, and in the drain pipe arrangement in compartment 12, FIG. 6, the counter weight is somewhat heavier than the drain pipe 15 whereby under centrifugal movement it tends to swing the drain pipe 15 away from the peripheral wall of the reservoir and into the vicinity of the free edge of the baffle ring 9. It will thus be understood that the volume of fluid retained within either of the compartment 12 and 13 depends upon the distance between the open end of its swingable drain pipe and the peripheral wall of the reservoir which governs the depth and volume of the centrifugal fluid ring in the compartment; the amount of centrifugal force generated by the varying speeds of rotation of the source of power and the reservoir governing the amplitude of the swinging movements of the drain pipes in relation to the torque of their torsion bars.

The partition 7 is spaced away from the runner 4 to provide a fluid chamber 23 communicating with the coupling through the peripheral space 24; and for the transfer of fluid between the chamber 23 and the reservoir and vice versa a pair of standard type fluid scoop pipes 25 and 26 suitably mounted upon a stationary sleeve 27 surrounding the driven shaft 5 are provided. The pipe 25 extends from the vicinity of the peripheral wall of the reservoir in the chamber 28 formed between the baffle ring 8 and the partition 7 to the central portion of the chamber 23, and the pipe 26 extends from the vicinity of the peripheral wall of the chamber 23 to the end of the reservoir and having a pair of outlet nozzles 31 and 32 directed towards the chambers 12 and 13. For the purpose of keeping the chamber 28 substantially empty, as accumulation of a ring of fluid therein would prevent proper flow of fluid thereinto from the chambers 12 and 13, the internal diameter of the scoop pipe 25 is greater than that of the scoop pipe 26.

In normal operation in the higher speed ranges, as illustrated in FIG. 3, it is desirable that a portion of the fluid be removed from the coupling-reservoir circuit; therefore as the reservoir is rotating at relatively high speed there is sufficient centrifugal force to swing the counter weight 22 of the drain pipe 15 outwardly against the torque of its torsion bar with resultant movement of the drain pipe 15 inwardly, and as the drain pipe 16 is somewhat heavier than its counterweight it simultaneously swings outwardly against the torque of its torsion bar, and whereby fluid passing from the chamber 23 through the scoop pipe 26 and ejected into the reservoir remains at low level in the compartment 13 with its outwardly swung drain pipe 16 and through which pipe fluid passes to the pipe 30 to empty into the chamber 28. At the same time fluid accumulates within the compartment 12 with its inwardly swung drain pipe 15 and through which pipe overflow fluid passes to also enter the compartment 28 from where fluid is returned to the coupling through the scoop pipe 25.

Figure 4:
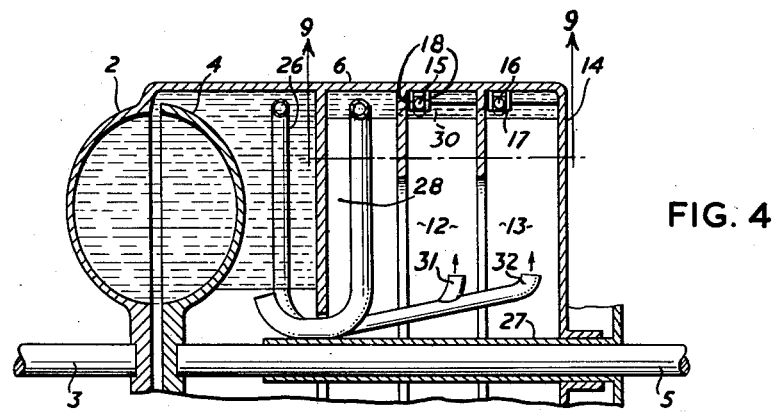

In normal operation in lower speed ranges as illustrated in FIG. 4 it is desirable that the circuit be completely filled without fluid being accumulated in either of the compartments 12 and 13, and to this end the torsional values of the torsion bars 19 and the positions and magnitudes of the counter weights 22 are so calculated and set that in the lower sped ranges the centrifugal force is insufficient to swing the counter weight 22 of the drain pipe 15 outwardly (and said drain pipe inwardly) against the torque of its torsion bar and mass of its counter weight, while being sufficient to swing the drain pipe 16 outwardly against the torque of its torsion bar and lesser counter weight mass and whereby both drain pipes 15 and 16 are centrifugally retained in their outward positions to eliminate accumulation of fluid within their chambers.

Figure 5:
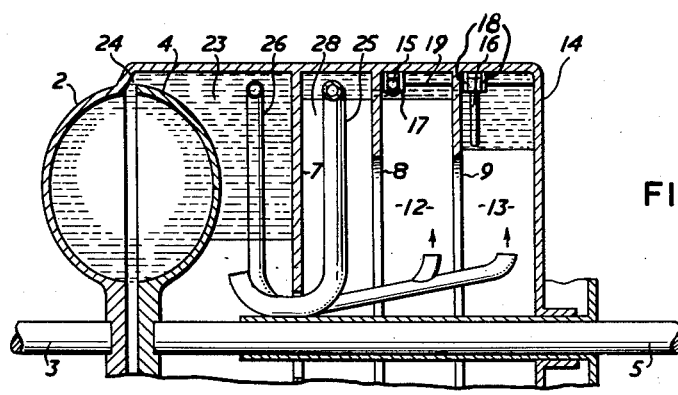

Under conditions as illustrated in FIG. 5, when the source of power such as an engine is being slowed down under a load tending to stall the runner 4 and when the engine is reaching MET (maximum engine torque) speed, the substantially reduced speed of rotation of the reservoir permits the twist in the torsion bar in the chamber 12 to overcome the centrifugal force acting upon its counter weight, and whereby the counter weight and the drain pipe 15 swing into the position shown in dotted lines in FIG. 6 and thus prevent the accumulation of fluid in the chamber 12. At the same time, the reduction of reservoir speed permits the torque in the torsion bar in the chamber 13 to overcome the centrifugal force acting upon its drain pipe and whereby the drain pipe swings into the position shown in dotted lines in FIG. 7 to accumulate fluid in the chamber 13 and thus leaving only sufficient fluid within the coupling-reservoir circuit to transmit maximum engine torque.

As FIGS. 3, 4, 5 and 9 are schematic views the fluid compartments 12 and 13 are not shown in accurate volumetric capacity relationship to each other or to the fluid chambers 23 and 28, and it will be therefore understood that the volume of fluid retained in the chamber 12, FIG. 3, at higher speed ranges is greater than the volume of fluid retained in the chamber 13, FIG. 5, when the driving engine is reaching maximum torque.

What I claim as my invention is:

1. A fluid coupling for transmission of power between a driving motor and a load, said coupling comprising a toroidal work chamber defined by a motor driven impeller and a load actuating runner actuated by circulating fluid in the work chamber, a fluid chamber axially disposed with the work chamber and having a radial dimension substantially the same as the work chamber and in fluid communication with the work chamber and rotating therewith and from which fluid is withdrawn by a fluid scoop in the fluid chamber under the influence of rotation of the fluid chamber, a cylindrical fluid reservoir having a cylindrical wall, the reservoir being axially disposed with the work chamber and rotating in unison with the impeller and receiving fluid withdrawn from the fluid chamber and from which fluid is constantly recirculated through the fluid chamber to the work chamber; self adjusting means for varying the volumetric fluid content of the work chamber and the reservoir in relation to varying speed of the driving motor whereby the power transmitting capacity of the coupling is analogous to the speed of the motor and comprising division of the reservoir into three annular compartments formed by two spaced radial partitions extending inwardly a substantial distance from the cylindrical wall of the reservoir, the scoop pipe in the fluid chamber continuously withdrawing fluid from said chamber and proportionally emptying it into two of the compartments, centrifugally responsive passage means transferring fluid from said two compartments, respectively, to the third compartment, each passage means being responsive to a different speed range, and a scoop pipe in the third compartment returning fluid to the fluid chamber at a greater rate than the fluid scoop in the fluid chamber removes fluid therefrom whereby the third compartment is kept substantially empty at all times and re-receiving fluid centrifugally withdrawn from fluid circulation through the work chamber and the reservoir, fluid conduits extending between the compartments and between one compartment and the work chamber and through which fluid flows from the reservoir to the work chamber, and centrifugally actuated means controlling the volume of fluid flow through the conduits in proportionate relationship relatively to varying speeds of the driving motor.

2. A fluid coupling as defined in claim 1, wherein the centrifugally responsive passage means comprises a swingable fluid drain pipe in each of the said compartments and having an outer open end for reception of fluid and an inner end about which the pipe swings and communicating with the exterior of its chamber, said pipes being swingable between the outer portions and inner portions of their compartments under centrifugal force generated by the rotating reservoir, the amplitudes of their swinging movements being governed by the speed of rotation of the reservoir.

3. A fluid coupling as defined in claim 1, wherein the centrifugally responsive passage means comprises a swingable fluid drain pipe in each of the said compartments and having an outer open end for reception of fluid and an inner end about which the pipe swings and communicating with the exterior of its chamber, a swingably mounted yoke member within which the inner end of the drain pipe is mounted, a counter weight swingable in unison with the yoke and the drain pipe and so balanced in relation to the weight of the drain pipe that under conditions where the reservoir is at rest the counter weight in one compartment overbalances its drain pipe and in another compartment is overbalanced by its drain pipe, resilient means retaining the drain pipes and the counter weights in predetermined positions when the reservoir is at rest, said pipes being swingable between the outer portions and inner portions of their compartments under centrifugal force generated by the rotating reservoir, the amplitudes of their swinging movements being governed by the speed of rotation of the reservoir.

References Cited in the file of this patent

UNITED STATES PATENTS

| | | |
|---|---|---|
| 2,875,581 | Kugel | Mar. 3, 1959 |
| 2,880,583 | Sinclair | Apr. 7, 1959 |